(12) United States Patent
Sakima et al.

(10) Patent No.: US 10,423,161 B2
(45) Date of Patent: Sep. 24, 2019

(54) PREDICTED COURSE ESTIMATING APPARATUS AND PREDICTED COURSE ESTIMATING METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Taku Sakima, Kariya (JP); Youhei Masui, Kariya (JP); Toyoharu Katsukura, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 31 days.

(21) Appl. No.: 15/529,914

(22) PCT Filed: Oct. 13, 2015

(86) PCT No.: PCT/JP2015/078898
§ 371 (c)(1),
(2) Date: May 25, 2017

(87) PCT Pub. No.: WO2016/084501
PCT Pub. Date: Jun. 2, 2016

(65) Prior Publication Data
US 2017/0364084 A1    Dec. 21, 2017

(30) Foreign Application Priority Data

Nov. 28, 2014  (JP) .................................. 2014-242231

(51) Int. Cl.
*G05D 1/02* (2006.01)
*B60R 21/00* (2006.01)
(Continued)

(52) U.S. Cl.
CPC ........... *G05D 1/0223* (2013.01); *B60R 21/00* (2013.01); *B60W 30/00* (2013.01); *B60W 40/10* (2013.01);
(Continued)

(58) Field of Classification Search
CPC ..... G05D 1/0223; B60R 21/00; B60W 30/00; B60W 40/10; G01S 13/931; G01S 9/00791; G07C 5/00; G08G 1/01
See application file for complete search history.

(56) References Cited

U.S. PATENT DOCUMENTS

2005/0228580 A1    10/2005  Winner et al.
2005/0251323 A1*   11/2005  Heinrichs-Bartscher ....................
                                                                            B60K 31/0008
                                                                                    701/117
2014/0297134 A1    10/2014  Sakima et al.

FOREIGN PATENT DOCUMENTS

JP    2004-066912 A    3/2004
JP    2006-126923      5/2006
(Continued)

*Primary Examiner* — Michael D Lang
(74) *Attorney, Agent, or Firm* — Knobbe, Martens, Olson & Bear, LLP (57) ABSTRACT

A predicted course estimating apparatus for estimating a predicted course of the own vehicle, includes: a data acquiring means for acquiring turning data that indicates a turning direction of the own vehicle; a filtering means for removing a high-frequency component that is included in the turning data; a course predicting means for calculating an estimated value for course prediction of the own vehicle, based on the turning data that has been filtered and a speed of the own vehicle; a determining means for determining whether the (Continued)

own vehicle is traveling a part of a road where the shape changes; and a characteristics changing means for changing the extent of removing of the high-frequency component by the filtering means when it is determined that the own vehicle is traveling a part of the road where the shape changes.

15 Claims, 4 Drawing Sheets

(51) Int. Cl.
    *B60W 30/00*     (2006.01)
    *B60W 40/10*     (2012.01)
    *G06K 9/00*     (2006.01)
    *G07C 5/00*     (2006.01)
    *G01S 13/93*     (2006.01)
    *G08G 1/16*     (2006.01)

(52) U.S. Cl.
CPC ........ *G01S 13/931* (2013.01); *G06K 9/00791* (2013.01); *G07C 5/00* (2013.01); *G08G 1/16* (2013.01); *G01S 2013/9325* (2013.01); *G01S 2013/9353* (2013.01); *G05D 2201/02* (2013.01)

(56) References Cited

FOREIGN PATENT DOCUMENTS

| | | |
|---|---|---|
| JP | 2006-341739 A | 12/2006 |
| JP | 2007-008281 | 1/2007 |
| JP | 2008-162492 A | 7/2008 |
| JP | 2009-009209 A | 1/2009 |
| JP | 2014-191596 A | 10/2014 |

* cited by examiner

PREDICTED COURSE ESTIMATING APPARATUS AND PREDICTED COURSE ESTIMATING METHOD

CROSS-REFERENCE TO RELATED APPLICATION

This application is based on and claims the benefit of priority from earlier Japanese Patent Application No. 2014-242231 filed on Nov. 28, 2014 the descriptions of which is incorporated herein by reference.

TECHNICAL FIELD

The present disclosure relates to predicted course estimating techniques for estimating a predicted vehicle course.

BACKGROUND ART

Vehicle control systems having an ACC (adaptive cruise control) function control the driving force and the braking force of the own vehicle to maintain a predetermined inter-vehicle distance between a preceding vehicle. In such vehicle control systems, in order to improve the performance of detecting the preceding vehicle, a predicted vehicle course is estimated based on the speed and the yaw rate of the own vehicle. When estimating a predicted course, filtering is carried out to remove a noise component (high-frequency component) that is included in the detected value of yaw rate (see PTL 1).

CITATION LIST

Patent Literature

[PTL 1] JP 2009-009209 A

SUMMARY OF THE INVENTION

However, when the own vehicle is traveling a part of a road where the shape changes, a response delay occurs due to the filtering, and this response delay may affect the accuracy of the estimation of the predicted course of the own vehicle.

An object of the present disclosure is to provide a technique for estimating a predicted course, which is capable of improving the accuracy of the estimation of a predicted course of the own vehicle.

Solution to Problem

The present disclosure is a predicted course estimating apparatus for estimating a predicted course of the own vehicle. The apparatus includes a data acquiring means for acquiring turning data that indicates a turning direction of the own vehicle; a filtering means for removing a high-frequency component included in the turning data; a course predicting means for calculating an estimated value for course prediction of the own vehicle based on the turning data that has been filtered and the speed of the own vehicle; a determining means for determining whether the own vehicle is going to travel a part of the road where the shape changes; and a characteristics changing means for changing the extent of removing of the high-frequency component by the filtering means when it is determined that the own vehicle is going to travel a part of the road where the shape changes.

According to the present disclosure, the extent of removing of a high-frequency component (noise component) by filtering is changed when the own vehicle is traveling a part of the road where the shape changes. In doing so, the predicted course estimating apparatus of the present disclosure is able to perform suitable filtering according to the shape of the road the own vehicle is traveling. Consequently, the accuracy of estimating a predicted course of the own vehicle using turning data (data of the turning direction of the own vehicle) that has been filtered can be enhanced.

DESCRIPTION OF THE EMBODIMENTS

Embodiments of the present disclosure will be described below based on the drawings.

Figure 1:
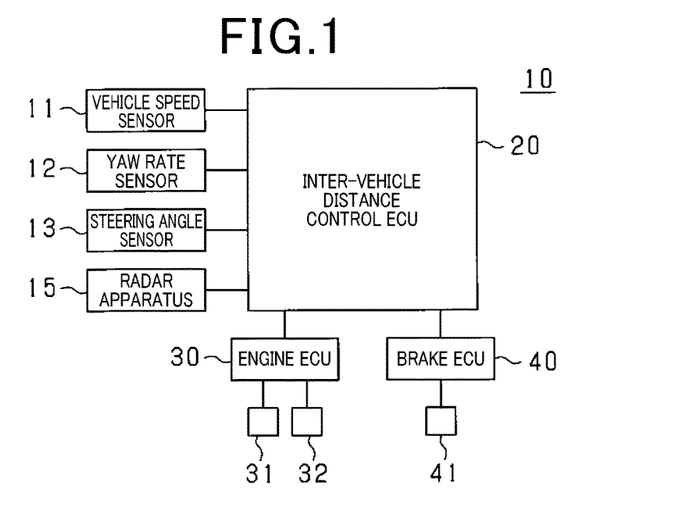
FIG. 1 is a block diagram illustrating a vehicle system.

FIG. 1 illustrates a block diagram of a vehicle system 10 of the present embodiment. In a vehicle in which the vehicle system 10 is mounted, the driving force of an engine which serves as a power source is transmitted to the wheels through a transmission, thereby driving the vehicle.

As illustrated in FIG. 1, the vehicle system 10 includes a vehicle speed sensor 11, a yaw rate sensor 12, a steering angle sensor 13, a radar apparatus 15, an inter-vehicle distance control ECU 20, an engine ECU 30, a brake ECU 40, and various actuators.

The vehicle speed sensor 11 determines the speed of the own vehicle by actual measurement or by estimation. For example, the vehicle speed sensor 11 includes plural wheel speed sensors for detecting the wheel speed of respective wheels, and estimates the speed of the own vehicle by using output signals from the plural wheel speed sensors.

The yaw rate sensor 12 detects the yaw rate (angular velocity around the center of gravity of a vehicle) actually generated in the own vehicle. The yaw rate sensor 12 has an oscillator such as a tuning fork, and detects the yaw rate of the own vehicle by detecting distortion that has occurred in the oscillator, based on the yaw moment of the own vehicle.

The steering angle sensor 13 detects the rotation angle at which the steering wheel of the own vehicle is rotated as the steering angle.

The radar apparatus 15 detects an object in the forward direction of the own vehicle. The radar apparatus 15 performs reciprocal scanning with an electromagnetic beam, including a laser beam, millimeter wave, sound wave or the like, in the direction that is orthogonal to the direction of travel of the own vehicle at a predetermined scanning angle. When the radar apparatus 15 receives an electromagnetic wave that is reflected by an object within the scanning range, the radar apparatus detects the distance, the relative speed, the direction and the like between the object that has reflected the electromagnetic wave and the own vehicle. Then, the radar apparatus 15 uses parameters such as the detected distance, the relative speed, the direction and the like to identify a preceding vehicle based on the object, and detects the inter-vehicle distance that is the distance between the preceding vehicle and the own vehicle, and the relative azimuth of the preceding vehicle with respect to the own vehicle.

The inter-vehicle distance control ECU 20 serves as a predicted course estimating apparatus for estimating a predicted course of the own vehicle, and controls the inter-vehicle distance between the own vehicle and the preceding vehicle to become equal to a target distance. The function of the inter-vehicle distance control ECU 20 as a predicted course estimating apparatus will be described in detail later.

The engine ECU 30 determines a throttle position according to a command signal that is received from the inter-vehicle distance control ECU 20 for controlling the inter-vehicle distance (hereafter, referred to as "inter-vehicle control") and the current vehicle speed, and controls a throttle actuator 31 while monitoring the throttle position. Moreover, based on a shift-up line and shift-down line that are predetermined for the throttle position, and the vehicle speed, the engine ECU 30 determines whether a gear range needs to be changed, and if it is necessary, gives an instruction to transmission 32 to change the gear range. The transmission 32 may be any mechanism such as an AT (automatic transmission), CVT (continuously variable transmission) and the like.

The brake ECU 40 applies a brake to the own vehicle by controlling the opening/closing and the position of a valve of a brake actuator 41 based on a command signal for controlling an inter-vehicle distance that is received from the inter-vehicle distance control ECU 20. The brake actuator 41 controls the deceleration (or acceleration) of the own vehicle by increasing, maintaining or decreasing the wheel cylinder pressure of each wheel by using a pressure that is generated in the working fluid (e.g., oil or the like) by a pump.

Figure 2:
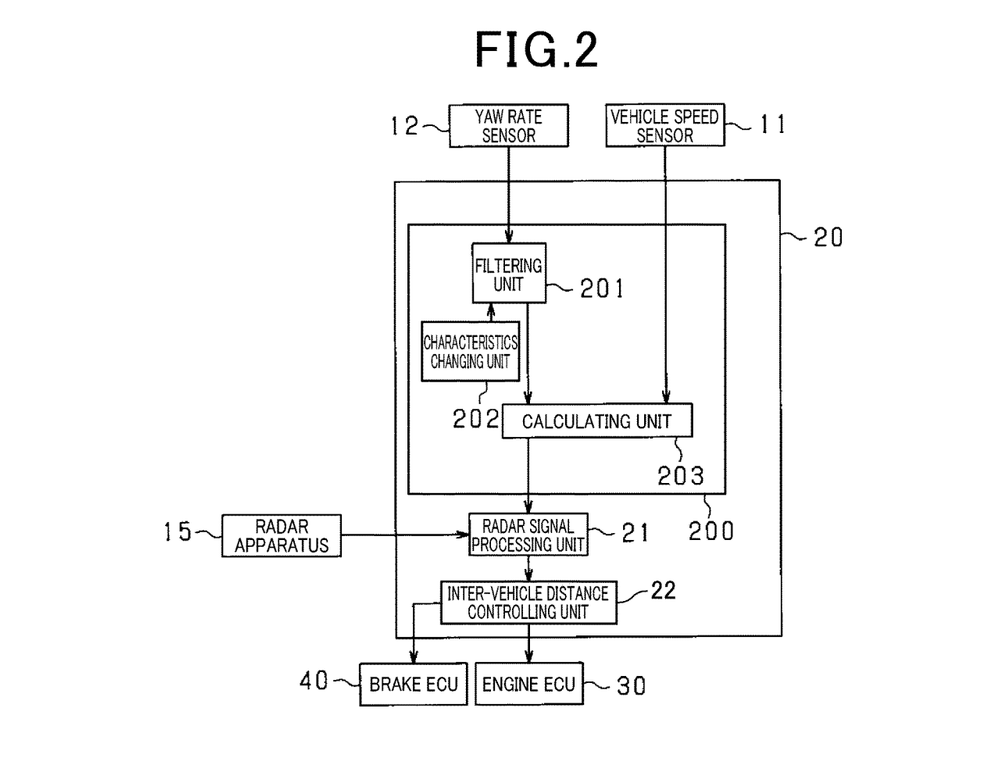
FIG. 2 is a functional block diagram illustrating an inter-vehicle distance control ECU.

Next, the inter-vehicle distance control ECU 20 will be described in detail. FIG. 2 is a functional block diagram of the inter-vehicle distance control ECU 20. The inter-vehicle distance control ECU 20 includes a radar signal processing unit 21, an inter-vehicle distance control unit 22, and a predicted course estimating unit 200.

The radar signal processing unit 21 is connected to the radar apparatus 15 and acquires information related to the preceding vehicle that is detected by the radar apparatus 15.

The inter-vehicle distance control unit 22 uses an output signal from the radar apparatus 15 and a predicted course of the own vehicle estimated by the predicted course estimating unit 200 to outputs a command signal to the engine ECU 30 and the brake ECU 40 to control the inter-vehicle distance between the own vehicle and the preceding vehicle to become closer to a target distance, via the radar signal processing unit 21. In other words, the inter-vehicle distance control unit 22 controls the brake operation force by outputting a command signal to the brake ECU 40 when the own vehicle is decelerated. When the own vehicle is accelerated, the inter-vehicle distance control unit 22, controls the throttle position and the gear ratio by outputting a command signal to the engine ECU 30.

The predicted course estimating unit 200 is connected to the vehicle speed sensor 11 and the yaw rate sensor 12, and serves as a filtering unit 201, a characteristics changing unit 202 and a calculating unit 203. The filtering unit 201 removes the noise component (hereafter, referred to as "high-frequency component") included in the turning direction data (hereafter, referred to as "turning data") of the own vehicle. The characteristics changing unit 202 changes the characteristics of the filter that removes the high-frequency component. The calculating unit 203 calculates an estimated value for the predicted course of the own vehicle.

The filtering unit 201 uses the value of the yaw rate that has been detected by the yaw rate sensor 12 as turning data to remove the high-frequency component included in the yaw rate by using an analog filter as given in Equation 1.

$$Y0 = Y \times 2\pi f \quad (1)$$

In Equation 1, Y is the value of the yaw rate that has been detected by the yaw rate sensor 12 (hereafter, referred to as "actual yaw rate"). $2\pi f$ is an analog filter (low-pass filter), and cuts (removes) the high-frequency component that is equal to or greater than a cutoff frequency f. Y0 is a filtered yaw rate (hereafter, referred to as "calculated yaw rate").

Situations in which the own vehicle travels a part of the road where the shape changes include, for example, the case in which the own vehicle enters a curve (or clothoid curve) from a straight line, or the case in which the own vehicle enters a straight road from a curve (or clothoid curve). Moreover, the situations include the case in which the own vehicle travels an S-shaped curve. In such situations, the amount of change per unit time $\Delta Y$ (rate of change) in the actual yaw rate Y (amount of change in the turning data) becomes large, and this may lead to a response delay in the filtering, and therefore, there is a concern that this may affect the inter-vehicle distance control between the own vehicle and the preceding vehicle.

Figure 3A:
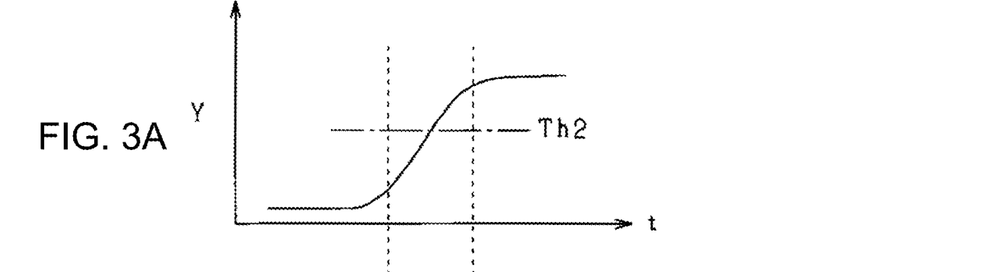
FIG. 3A is a graph illustrating an actual yaw rate relative to a threshold value.
Figure 3B:
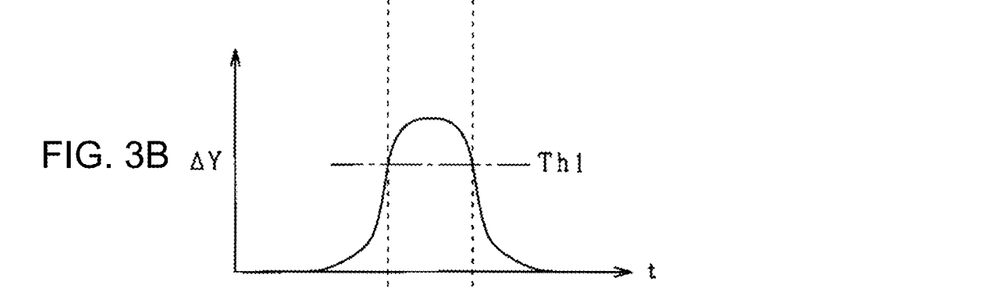
FIG. 3B is a graph illustrating an amount of change in yaw rate relative to a threshold value.

In the predicted course estimating unit 200 of the present embodiment, the characteristics changing unit 202 changes filtering characteristics in the filtering, according to the result of the determination as to whether the own vehicle is going to travel a part of the road where the shape changes. With reference a set of diagrams of FIGS. 3A and 3B, the relationship between the change in the yaw rate and the settings of filtering characteristics in the case in which the own vehicle travels a straight part (straight road) and a curved part (curved road) will be described. As shown in FIGS. 3A and 3B, when the own vehicle is traveling a part of the road other than a straight part, the amount of change $\Delta Y$ in the actual yaw rate Y of the own vehicle becomes less than a predetermined first threshold value Th1. In this case, the cutoff frequency f of the filter is set to a low frequency f1. On the other hand, when the own vehicle approaches a curved part of the road, the amount of change $\Delta Y$ in the actual yaw rate Y (=dY/dt) becomes equal to or greater than the predetermined first threshold value Th1. In this case, the cutoff frequency f of the filter is set to a high frequency f2 (f2>f1).

As described above, in the vehicle system 10 of the present embodiment, when the own vehicle is traveling a part of the road other than a part where the shape changes, more of the high-frequency component of the actual yaw rate Y is removed, thereby improving the stability of the calculated yaw rate. On the other hand, when the own vehicle is traveling a part of the road where the shape changes, less of the high-frequency component of the actual yaw rate Y is removed, and the response delay due to the filtering is reduced. Accordingly, the responsiveness of predicted course estimation (own vehicle's followability) is improved.

When the own vehicle is traveling a part of the road where the shape changes, it is preferable to immediately change the extent of removing of the high-frequency component (ratio of removal) by the filtering to instantaneously improve the responsiveness of the predicted course estimation. In this regard, in the case where the actual yaw rate Y becomes equal to or greater than the first threshold when traveling a part of the road where the shape changes, the predicted course estimating unit 200 of the present embodiment uses the characteristics changing unit 202 to immediately switch the filter from the filter in which the cutoff frequency is set to f1 into the filter in which the cutoff frequency is set to f2.

However, when the cutoff frequency f of the filter is set to the high frequency f2, the extent of removing the high-frequency component by the filtering will be decreased. Therefore, when switching the filter from the filter in which the cutoff frequency is set to f2 into the filter in which the cutoff frequency is set to f1 (when the extent of removing the high-frequency component by the filtering is increased), there is a concern that overshooting will occur and it will be difficult to eliminate the influence of the remaining high-frequency component on the actual yaw rate Y during the filtering in which the cutoff frequency is set to f2 (filtering performed in the case when the extent of removing the high-frequency component is low).

Figure 3C:
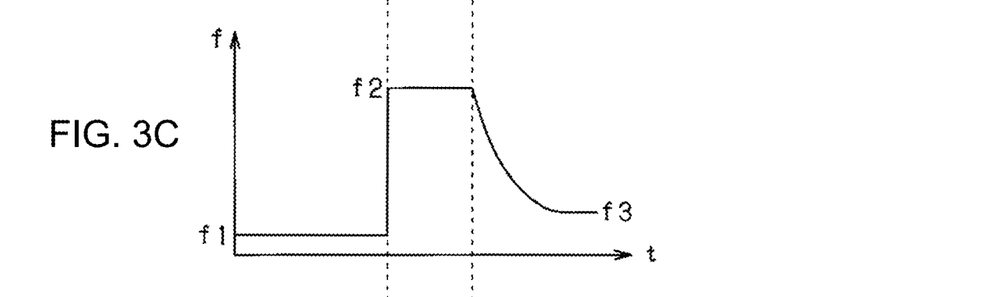
FIG. 3C is a graph illustrating a change in cutoff frequency.
Figure 3D:
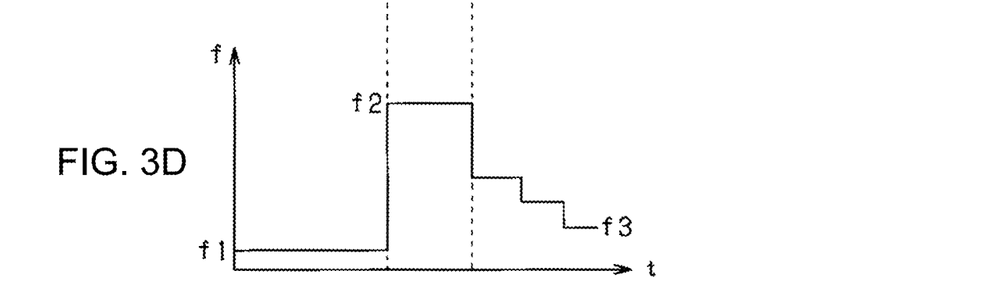
FIG. 3D is a diagram illustrating a stepwise change in cutoff frequency.

Therefore, when switching the filter from the filter in which the cutoff frequency is set to f2 into the filter in which the cutoff frequency is set to f1, the characteristics changing unit 202 of the present embodiment gradually changes the cutoff frequency f. For example, as shown in FIG. 3C, the characteristics changing unit 202 changes the cutoff frequency from f2 to f3, and then from f3 to f1 according to the predetermined amount of change Δf that expresses curvilinear change per unit time. Alternatively, as shown in FIG. 3D, the characteristics changing unit 202 changes the cutoff frequency from f2 to f3, and then from f3 to f1 according to the predetermined amount of change Δf that expresses a stepwise change per unit time. Accordingly, the vehicle system 10 of the present embodiment reduces the occurrence of the aforementioned overshooting when changing the filtering characteristics from characteristics with which less of the high-frequency component is removed (characteristics with low extent of removing) to characteristics with which more of the high-frequency component is removed (characteristics with high extent of removing).

Further, in the present embodiment, when the own vehicle is not traveling a part of the road where the shape changes, the extent of removing of the high-frequency component included in the turning data is set according to the shape of the road the own vehicle is traveling then. In other words, the actual yaw rate Y is different between the case in which the own vehicle is traveling a straight part of a road, and the case in which the own vehicle is traveling a curved part. Therefore, when the own vehicle is not traveling a part of the road where the shape changes, the predicted course estimating unit 200 of the present embodiment sets the cutoff frequency f of the filter according the actual yaw rate Y using the characteristics changing unit 202. Specifically the characteristics changing unit 202 of the present embodiment sets the higher cutoff frequency f of the filter in the case where the own vehicle is traveling a curved part, compared with the case where the own vehicle is traveling a straight part. Consequently, the vehicle system 10 of the present embodiment can satisfy both stability and responsiveness of the predicted course of the own vehicle when the own vehicle is not passing through a part of the road where the shape changes.

Referring back to FIG. 2, the calculating unit 203 is connected to the vehicle speed sensor 11 and the filtering unit 201, and calculates an estimated value R for the predicted course of the own vehicle by performing calculation of Equation (2) using the vehicle speed V and calculated yaw rate Y0.

$$R=V/Y0 \qquad (2)$$

The calculated estimated value R of the predicted course is used for inter-vehicle distance control by the inter-vehicle distance control unit 22.

Figure 4:
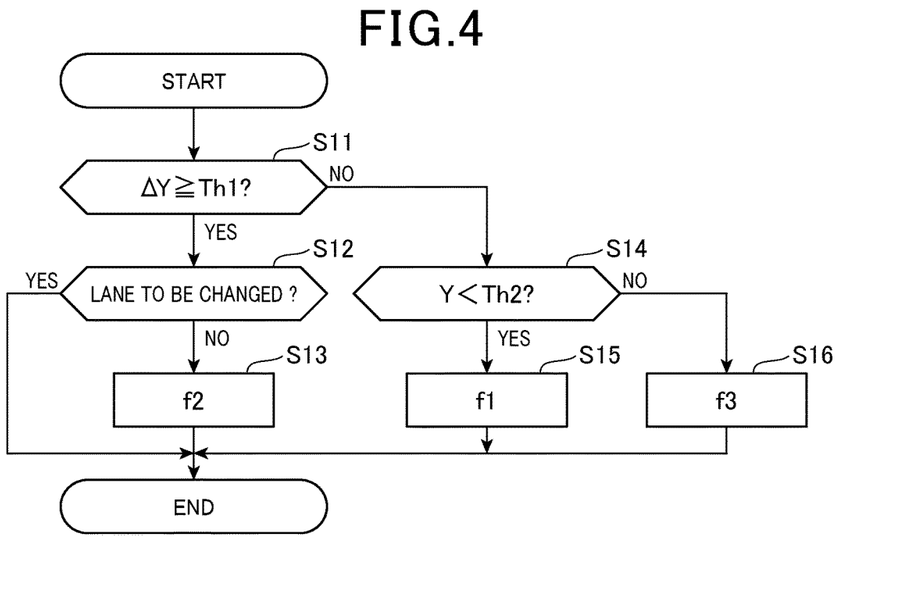
FIG. 4 is a flow diagram of illustrating change of filter characteristics in predicted course estimation.

Next, the procedure for the filter characteristics changing process in the predicted course estimation of the own vehicle will be described. The process shown in FIG. 4 is repeatedly performed by the predicted course estimating unit 200 under the condition that inter-vehicle distance control is performed by the inter-vehicle distance control ECU 20. In the following description, the relationship between the filter cutoff frequencies f1 to f3 is f2>f3>f1.

The predicted course estimating unit 200 of the present embodiment causes the characteristics changing unit 202 to determine whether the amount of change ΔY in the actual yaw rate Y is equal to or greater than the first threshold value Th1 (S11). The processing of S11 corresponds to a process of determining whether the own vehicle is traveling a part of the road where the shape changes (determining means). When it is determined that the amount of change ΔY is less than the first threshold value Th1 (ΔY<Th1; NO at S11), the predicted course estimating unit 200 determines whether the actual yaw rate Y is less than the second threshold value Th2 (S14). In other words, in the processing of S14, it is determined whether the actual yaw rate Y is less than the second threshold value Th2 when it is determined that the own vehicle is not traveling a part of the road where the shape changes. When it is determined that the actual yaw rate Y is equal to or greater than the second threshold value Th2 (Y≥Th2; NO at S14), the predicted course estimating unit 200 causes the characteristics changing unit 202 to set the cutoff frequency f of the filter to f3 (S16). However, when it is determined that the actual yaw rate Y is less than the second threshold value Th2 (Y<Th2; YES at S14), the predicted course estimating unit 200 causes the characteristics changing unit 202 to set the cutoff frequency f of the filter to f1 (S15). Moreover, when it is determined that the amount of change ΔY is equal to or greater than the first threshold value Th1 (ΔY≥Th1; YES at S11), the predicted course estimating unit 200 determines whether the own vehicle is making a lane change (whether there is a lane change) (S12). In other words, the processing of S12 determines whether there is a lane change when it is determined that the own vehicle is traveling a part of the road where the shape changes. For example, when manipulation of the direction indicator is detected, and thus it is determined that a lane change is to be made (YES at S12), the predicted course estimating unit 200 terminates the processing. It should be noted that the detection of manipulating the direction indicator corresponds to a process of detecting whether the own vehicle makes a lane change (lane change detecting means). However, when it is determined that no lane change is to be made (NO at S12), the predicted course estimating unit 200 causes the characteristics changing unit 202 to set the cutoff frequency f of the filter to f2 (S13).

Figure 5:
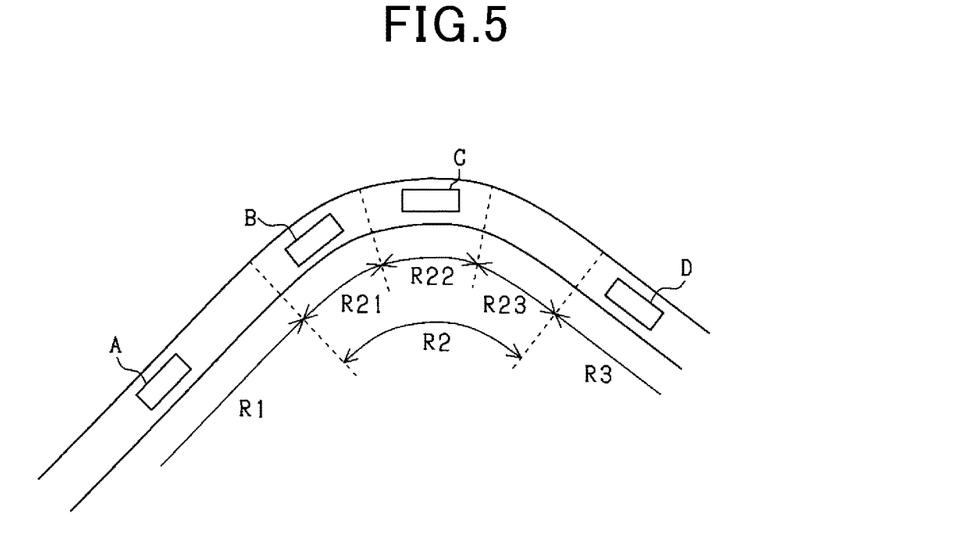
FIG. 5 illustrates an example of change of filter characteristics in predicted course estimation.

Next, with reference to FIG. 5, an example of execution of the process set forth above will be described. In the following description, neither the own vehicle nor the preceding vehicle makes a lane change. Further, the road shown in FIG. 5 has a first straight part R1, a curved part R2, and a second straight part R3. Of these, the curved part R2 has a first curvature change part R21 entailing curvature change (clothoid curve change) at the entrance of the curve, a constant curvature part R22 having constant curvature, and a second curvature change part R23 entailing a curvature change (clothoid curve change) at the exit of the curve.

When the own vehicle is at a location A in the first straight part R1 during traveling, since the location A is not in a part of the road where the shape changes, the amount of change $\Delta Y$ in the actual yaw rate Y becomes less than the first threshold value Th1, and the actual yaw rate Y becomes less than the second threshold value Th2. Accordingly, the cutoff frequency f of the filter is set to f1. In this case, the extent of removing of the high-frequency component of the actual yaw rate Y is increased. Then, when the own vehicle is at a location B in the first curvature change part R21 at the entrance of the curve during traveling, since the location B is in a part of the road where the shape changes, the amount of change $\Delta Y$ in the actual yaw rate Y is equal to or greater than the first threshold value Th1. Accordingly, the cutoff frequency f of the actual yaw rate Y is immediately switched from f1 to f2. At this time, switching of the cutoff frequency f is performed instantaneously at the beginning of entering into the first curvature change part R21.

When the own vehicle is at a location C in the constant curvature part R22 during traveling, the amount of change $\Delta Y$ in the actual yaw rate Y becomes less than the first threshold value Th1, and the actual yaw rate Y becomes equal to or greater than the second threshold value Th2. Accordingly, the cutoff frequency f of the filter is changed from f2 to f3. At this time, as shown in FIG. 3C or 3D, the cutoff frequency f is gradually changed from cutoff frequency f2 to f3.

When the own vehicle is traveling the second curvature change part R23 at the exit of the curve, the amount of change $\Delta Y$ in the actual yaw rate Y again becomes equal to or greater than the first threshold value Th1. Accordingly, the cutoff frequency f of the filter is instantaneously changed from f3 to f2. After that, when the own vehicle is at a location D in the second straight part R3 during traveling, the amount of change $\Delta Y$ in the actual yaw rate Y becomes less than the first threshold value Th1. Accordingly, the cutoff frequency f of the filter has gradually changed from f2 to f1, and then the cutoff frequency f is maintained at f1.

According to the above description, the vehicle system 10 of the present embodiment provides the following advantageous effects.

In estimating a predicted course of the own vehicle based on vehicle speed V and turning data (actual yaw rate Y) of the own vehicle, filtering is performed to remove the high-frequency component included in the turning data. However, when the own vehicle is traveling a part of the road where the shape changes, since the amount of change in the turning data (amount of change $\Delta Y$ in the actual yaw rate Y) becomes large, a response delay occurs due to the filtering, and there is a concern that this response delay may affect the predicted course estimation. Therefore, in the vehicle system 10 of the present embodiment, when the own vehicle is traveling a part of the road where the shape changes, the extent of removing of the high-frequency component by the filtering (cutoff frequency f) is changed. Consequently, the vehicle system 10 of the present embodiment is capable of performing suitable filtering according to the shape of the road the own vehicle is traveling, thereby improving the accuracy of estimating a predicted course of the own vehicle using turning data that has been filtered.

The vehicle system 10 of the present embodiment gradually changes the extent of removing of the high-frequency component (ratio of removal) in the case where the filter characteristics are changed into characteristics with which more of the high-frequency component is removed (characteristics with high ratio of removal), compared with the case where the filter characteristics are changed into characteristics with which less of the high-frequency component is removed (characteristics with low ratio of removal). Accordingly, the vehicle system 10 of the present embodiment can reduce problems that occur in the turning data when changing the filtering characteristics into characteristics with which the high-frequency component is easily removed.

The vehicle system 10 of the present embodiment is capable of performing filtering, distinguishing a change in direction such as a lane change from a change in the shape of the road such as a straight road or curved road.

When the own vehicle is traveling an entrance part of a curve of the road (first curvature change part R21) or the exit part (second curvature change part R23), the amount of change $\Delta Y$ in the turning data becomes large. Therefore, the vehicle system 10 of the present embodiment changes the filter characteristics into characteristics with which less of the high-frequency component is removed. Consequently, the vehicle system 10 of the present embodiment can reduce the response delay of the filtering due to the large amount of change $\Delta Y$ in the turning data.

When the own vehicle is traveling a curve (curved part R2) that has the first curvature change part R21 and the second curvature change part R23 entailing a curvature change, and a constant curvature part R22 having a constant curvature, the amount of change $\Delta Y$ in the turning data becomes larger in the first and second curvature change parts R21, R23 than the constant curvature part R22. Therefore, the vehicle system 10 of the present embodiment changes the filter characteristics into characteristics with which less of the high-frequency component is removed. Consequently, the vehicle system 10 of the present embodiment can enhance the effect of reducing response delay due to the filtering performed in the first and second curvature change parts R21, R23.

The effect of the high-frequency component included in the turning data upon the predicted course depends on the vehicle speed V of the own vehicle. Therefore, the vehicle system 10 of the present embodiment changes the extent of removing of the high-frequency component according to the vehicle speed V. In doing so, the vehicle system 10 of the present embodiment can suitably remove the high-frequency component included in the turning data, according to the vehicle speed V. Consequently, the accuracy of estimating a predicted course can be enhanced.

The present embodiment is not limited to the above embodiment, and may be implemented as follows.

In the above embodiment, the predicted course estimating unit 200 uses the actual yaw rate Y as turning data. However, the embodiment is not limited to this. The turning data may also be the value of the steering angle detected by the steering angle sensor 13, or the value of the torque detected by a torque sensor.

In the above embodiment, the part of the road where the shape changes is determined based on the amount of change $\Delta Y$ in the turning data. However, the embodiment is not limited to this. The method of determining the part of the road where the shape changes also includes a method in which the part of the road where the shape changes is determined by using information from outside the vehicle such as results of detection of white lines (or guard rail shape) detected through processing of images captured by a camera provided at the front of the vehicle, or navigation information. Also in this case, the vehicle system 10 changes the extent of removing of the high-frequency component from the turning data, based on the results of the determination as to whether the part of the road is a part where the shape changes.

Figure 6:
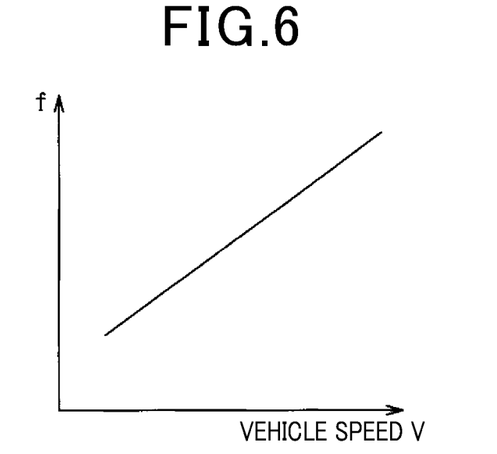
FIG. 6 is a diagram illustrating an example of alternation of filtering.

In the above embodiment, the extent of removing of the high-frequency component (cutoff frequency f) is changed according to the turning data. However, the embodiment is not limited to this. The extent of removing of the high-frequency component may be changed according to the vehicle speed V. In other words, as shown in Equation (2) in above embodiment, the influence of the actual yaw rate Y on the estimated value R for the predicted course becomes smaller, as the vehicle speed V becomes higher (the speed becomes faster). Therefore, as shown in FIG. 6, when the vehicle speed V is low (speed is slow), the cutoff frequency f of the filter is set to be low to enhance the effect of reducing the high-frequency component included in the actual yaw rate Y. On the other hand, when the vehicle speed V is high (speed is fast), the cutoff frequency f of the filter is set to be high to minimize the effect of reducing the high-frequency component included in the actual yaw rate Y and to enhance the responsiveness of the predicted course estimation.

In the above embodiment, the extent of removing of the high-frequency component is changed by changing the cutoff frequency f of the filter. However, the embodiment is not limited to this. The extent of removing of the high-frequency component may be changed by changing the time constant τ of the filter. In other words, when the own vehicle is not traveling a part of the road where the shape changes, the time constant τ of the filter is set to be relatively large to increase the extent of removing of the high-frequency component included in the actual yaw rate Y. On the other hand, when the own vehicle is travelling a part of the road where the shape changes, the time constant τ of the filter is set to be small to decrease the extent of removing of the high-frequency component of the actual yaw rate Y, and to enhance the responsiveness of the predicted course estimation.

In the above embodiment, when the amount of change ΔY in the turning data of the own vehicle is equal to or greater than a predetermined first threshold value Th1, the cutoff frequency f of the filter is set to be high. However, the embodiment is not limited to this. The cutoff frequency f of the filter in this case may be set to be low.

The form of changing the filter characteristics may be the same in both case in which the filter characteristics are changed into characteristics with which more of the high-frequency component is removed, and the case in which the filter characteristics are changed into characteristics with which less of the high-frequency component is removed.

REFERENCE SIGNS LIST

10 . . . Vehicle system, 11 . . . Vehicle speed sensor, 12 . . . Yaw rate sensor, 13 . . . Steering angle sensor, 15 . . . Radar apparatus, 20 . . . Inter-vehicle distance control ECU, 200 . . . Predicted course estimating unit, 201 . . . Filtering unit, 202 . . . Characteristics changing unit, 203 . . . Calculating unit, A . . . Location, B . . . Location, C . . . Location, D . . . Location, R21 . . . First curvature change part, R22 . . . Constant curvature part, R23 . . . Second curvature change part, V . . . Vehicle speed

The invention claimed is:

1. A predicted course estimating apparatus for estimating a predicted course of an own vehicle, comprising:
    a data acquiring means for acquiring turning data that indicates a turning direction of the own vehicle;
    a filtering means for removing a high-frequency component that is included in the turning data;
    a course predicting means for calculating an estimated value for course prediction of the own vehicle, based on the turning data that has been filtered, and a speed of the own vehicle;
    a determining means for determining whether the own vehicle is traveling on a part of the road where the shape changes; and
    a characteristics changing means for changing a cutoff frequency of the filtering means to change a low extent of removing of the high-frequency component by the filtering means, in response to determining that the own vehicle is traveling on a part of the road where the shape changes.

2. The predicted course estimating apparatus according to claim 1, wherein
    the characteristics changing means gradually changes an extent of removing of the high-frequency component when changing filter characteristics of the filtering means into characteristics with a high extent of removing of the high-frequency component, compared to when changing filter characteristics of the filtering means into characteristics with the low extent of removing of the high-frequency component.

3. The predicted course estimating apparatus according to claim 1, comprising:
    a lane change detecting means for detecting whether a lane change of the own vehicle is to be made; wherein
    the characteristics changing means changes an extent of removing of the high-frequency component in response to determining that the own vehicle is traveling on a part of the road where the shape changes and the lane change is to be made.

4. The predicted course estimating apparatus according to claim 1, wherein
    the characteristics changing means changes the filter characteristics of the filtering means into characteristics with the low extent of removing of the high-frequency component in response to determining that the own vehicle is traveling on an entrance part of a curve of a road.

5. The predicted course estimating apparatus according to claim 1, wherein
    the characteristics changing means changes the filter characteristics of the filtering means into characteristics with the low extent of removing of the high-frequency component in response to determining that the own vehicle is traveling on an exit part of a curve of a road.

6. The predicted course estimating apparatus according to claim 1, wherein
    in response to determining that the own vehicle is traveling on a curve of a road having a curvature change part that entails a curvature change, and a constant curvature part where the curvature is constant, the characteristics changing means changes the filter characteristics of the filtering means that are applied to traveling on the curvature change part, into filter characteristics with the lower extent of removing of the high-frequency component, than the filter characteristics that are applied to traveling on the constant curvature part.

7. The predicted course estimating apparatus according to claim 1, wherein
the characteristics changing means changes an extent of removing of the high-frequency component according to the vehicle speed.

8. The predicted course estimating apparatus according to claim 1, wherein
the characteristics changing means changes an extent of removing of the high-frequency component according to a curvature of a road the own vehicle is traveling.

9. The predicted course estimating apparatus according to claim 1, wherein
the turning data is a yaw rate of the own vehicle or a detected value of a steering angle.

10. The predicted course estimating apparatus according to claim 1, comprising:
an object detecting means provided in the own vehicle to detect an object located in a forward direction of the own vehicle; and
a following travel controlling means that, in response to determining that the object is a preceding vehicle, controls acceleration and deceleration of the own vehicle to follow the preceding vehicle while maintaining an inter-vehicle distance between the preceding vehicle and the own vehicle.

11. The predicted course estimating apparatus according to claim 1 wherein
the characteristics changing means increases the cutoff frequency in response to determining that the own vehicle is traveling on a part of the road where the shape changes, and decreases the cutoff frequency in response to determining that that the own vehicle is not traveling on a part of the road where the shape changes.

12. The predicted course estimating apparatus according to claim 1, wherein
the characteristics changing means gradually changes an extent of removing of the high-frequency component when changing filter characteristics of the filtering means into characteristics by decreasing the cutoff frequency, compared to when changing filter characteristics of the filtering means into characteristics with increasing the cutoff frequency.

13. The predicted course estimating apparatus according to claim 1, wherein
the characteristics changing means decreases a time constant of the filtering means in response to determining that that the own vehicle is traveling on a part of the road where the shape changes, and increases the time constant in response to determining that the own vehicle is not traveling on a part of the road where the shape changes.

14. A predicted course estimating method for estimating a predicted course of an own vehicle, comprising:
a step of acquiring turning data that indicates a turning direction of the own vehicle;
a step of executing filtering for removing a high-frequency component included in the turning data;
a step of calculating an estimated value for course prediction of the own vehicle, based on the turning data that has been filtered, and a speed of the own vehicle;
a step of determining whether the own vehicle is traveling on a part of the road where the shape changes; and
a step of changing a cutoff frequency of the filtering to change a low extent of removing of the high-frequency component by the filtering, in response to determining that the own vehicle is traveling on a part of the road where the shape changes.

15. A predicted course estimating apparatus for estimating a predicted course of an own vehicle, comprising:
a memory;
a processor communicable to the memory; and
a set of computer-executable instructions stored on the memory that cause the processor to implement:
acquiring turning data that indicates a turning direction of the own vehicle,
removing a high-frequency component that is included in the turning data,
calculating an estimated value for course prediction of the own vehicle, based on the turning data that has been filtered, and a speed of the own vehicle,
determining whether the own vehicle is traveling on a part of the road where the shape changes, and
changing a cutoff frequency to change a lowermost extent of removing of the high-frequency component by a filter, in response to determining that the own vehicle is traveling on a part of the road where the shape changes.

* * * * *